United States Patent Office 3,135,722
Patented June 2, 1964

3,135,722
PROCESS FOR THE PRODUCTION OF POLYMERS
FROM ACRYLONITRILE
Heino Logemann, Leverkusen, Germany, assignor to Farbenfabriken Bayer Aktiengesellschaft, Leverkusen, Germany, a corporation of Germany
No Drawing. Filed July 19, 1960, Ser. No. 43,724
Claims priority, application Germany July 29, 1959
6 Claims. (Cl. 260—85.5)

This invention relates to a special process for the production of polymers from acrylonitrile and comprises the simultaneous application of certain means.

It is known to polymerise acrylontirile in aqueous medium by itself or in admixture with other vinyl compounds at pH values below 7, using Redox systems with a bases of per-compounds and sulphur compounds of low oxidation stages. The polymers obtained hereby serve for the porduction of shaped articles, such as filaments, foils, fibres and the like. These polymers show a low thermostability, especially when heavy metal ions are added for accelerating the polymerisation. The low thermostability leads to a strong yellowing at relatively high temperatures and in the presence of air, and this constitutes a disadvantage when using the fibre materials which are manufactured from such polymers.

It has already been proposed to add complex formers to the heavy metal ions and to reduce the harmful influence thereof on the thermostability. However, in such a case there are obtained products with such high molecular weights that it is not possible to produce spinning solutions with a sufficiently high concentration therefrom; alternatively there is such a clear reduction in the conversion that the processes have no industrial significance.

It is an object of the present invention to provide polymers from acrylonitrile which have a light-coloured initial tone, low tendency to discoloration and a good fastness to light. It is another object of the present invention to provide a special process for the production of said polymers from acrylonitrile with a high polymerisation velocity and high yields. A still further object is to provide a special polymerisation process which enables one to adjust any desired molecular weight. Still further object will become apparent hereinafter.

It has now been found that acrylonitrile polymers or copolymers having a light initial tone, good fastness to light, high thermostability and a low tendency to yellowing under the simultaneous action of heat and oxygen are obtained if the following known polymerisation steps are combined in the following new manner during the polymerisation:

The use of a Redox system with a base of per-compounds and sulphur compounds of a low oxidation stage, adjustment of a pH value below 7 (advantageously below 3) addition of heavy metal ions, complex formers and, for adjusting the molecular weight, addition of regulators.

By adding the regulators in accordance with the invention, the excessive molecular weight of the polymers, obtained when using heavy metal ions and complex formers, can be lowered into the required range.

Suitable as per-compounds are the alkali metal salts, particularly the sodium and potassium salts of persulphuric acid. The most important sulphur compounds of a low oxidation stage are: sulphur dioxide, alkali metal pyrosulphites, alkali metal bisulphites, alkali metal thiosulphates and the corresponding ammonium salts. The sodium and potassium salts are especially suitable among the alkali salts. The per-compounds are used in quantities from 0.5 to 5%, related to the monomers to be polymerised, and advantageously in amounts of 1 to 2%. The sulphur compounds of low oxidation stage are used in quantities from 0.5 to 10%, related to the monomers to be polymerised, advantageously 1 to 4%.

The heavy metal ions, which are preferably added in the form of their salts (such as sulphates, chlorides or nitrates), mainly comprise the divalent iron and copper. Generally speaking, quantities of 0.00001 to 0.1%, related to the monomers used, are sufficient.

Especially suitable as complex formers for the heavy metal ions are the alkali metal fluorides, alkali metal pyrophosphates, alkali metal hexametaphosphates and also the corresponding ammonium salts. Potassium and sodium salts are preferred as alkali metal salts. Also quite suitable are imidotriglycolic acid and ethylene diamine tetracetic acid.

Complex formers are used in quantities from 0.1 to 3%, related to the monomers to be polymerised, and advantageously between 0.1 to 1%.

It is a feature of the present invention that both the heavy metal ions and the complex formers can be used in very large quantities without the polymerisation product becoming coloured or being formed with low yields. In particular, it is advisable to add the sulphur compounds in a quantity substantially exceeding the equivalent weight of the per-compounds. Mainly concerned as regulators are mercaptans, and especially at least partially water-soluble aliphatic mercaptans, such as butyl mercaptans, hexyl mercaptans and ethylene, butylene and hexylene dithioglycols. Especially suitable are those mercaptans which carry a hydroxyl group in the vicinity of the mercapto group, such as thioglycol. The quantity of these regulators to be added depends on the required molecular weight of the polymer, but is in the range of from 0.05 to 3% and advantageously 0.1 to 0.3%, related to the polymerisable starting material. The more regulator is added, the lower is the molecular weight.

The process is suitable both for polymerising acrylonitrile by itself and for copolymerising acrylonitrile with other vinyl compounds, for example esters of a crylic and methacrylic acid, styrene, vinyl chloride, vinylidene chloride and vinyl acetate. It is also possible to use vinyl compounds with reactive groups, such as unsaturated amines, amides or unsaturated carboxylic acids or sulphonic acids, such as acrylic acid and styrene sulphonic acid.

The polymerisation process according to the invention is also of advantage when polymerising acrylonitrile in the presence of polymers containing sulpho groups or sulphuric acid ester groups.

The polymers which contain sulpho groups can be copolymers or homopolymers. They are generally obtained by polymerisation of olefinic monomers which already contain the sulpho groups. It is however also possible for sulphonic acid groups to be subsequently introduced by sulphonation into the polymeric compounds. Examples of these are subsequently sulphonated polystyrene or rubber-sulphonic acid. Suitable as polymers containing sulpho groups are polymers of monoethylenically unsaturated monomers with sulphonic acid groups, which are bonded directly to carbon atoms of the polymer chain or are linked through aliphatically, aromatically or alicyclically bonded carbon atoms or through hetero atoms to the polymer chain. Included herein are inter alia polyvinyl sulphonic acid, polyallyl sulphonic acid, polymethallyl sulphonic acid, polyallyl methoxy sulphonic acid, polystyrene sulphonic acid, polymethyl styrene sulphonic acid, polyhydroxy styrene sulphonic acid, polymethoxy styrene sulphonic acid. The following are also suitable: sulphuric acid esters of polyhydric alcohols, such as sulphuric acid esters of polyvinyl alcohol, cellulose and others. The acid groups can also be present in the form of their salts or can subsequently be transformed into such salts. It is preferred to use the potassium, sodium, calcium, zinc and tin salts.

The polymerisation according to the invention is in itself carried out in the usual manner and water is used as polymerisation medium. It is advantageous to employ 500–1000 parts by weight of water to 100 parts by weight of monomer. The reaction temperatures are between 30 and 70° C., preferably between 40 and 50° C. It has proved especially advantageous to start the polymerisation with some of the reactants and auxiliary substances and then progressively to add all the constituents of the mixture.

The pH value, which is below 7 and is advantageously between 1 and 3, is generally adjusted with dilute sulphuric acid, but other mineral acids can also be used for this purpose.

The polymers obtained by the process according to the invention are distinguished by a light-coloured initial tone and a low tendency to discolouration on being heated in the presence of air. The polymerisation velocity is fully adequate for industrial purposes and it is possible without any difficulty to produce conversions higher than 80%. Furthermore, any desired molecular weight of the polymer can be adjusted by altering the quantity of the regulator without the conversion and the properties of the polymers being impaired.

The present invention is further disclosed in the following examples which are illustrative but not limitative thereof.

EXAMPLE 1

(A) A polymerisation batch consisting of 95 parts by weight of acrylonitrile and 5 parts by weight of methyl acrylate is mixed at 50° C. with 700 parts by weight of water and 25 parts by weight of normal sulphuric acid, of 2 parts by weight of potassium persulphate, and 2 or 3 parts by weight of sodium pyrosulphite, excluding any impurity of heavy metals. A 93% conversion is obtained in 8½ hours and an 88% conversion is obtained in 4 hours, and after washing three times with distilled water and drying at 50° C., there are obtained two polymers, which have a K-value according to Fikentscher (Lunge-Berl, Chem. Techn. Untersuchungs-methoden, 8th edition, vol. 5 (1934), page 945) of 145. No heavy metal ions, no complex formers and also no regulators are used with this polymerisation batch and the K-value obtained is far too high for polymers which are intended to be spun.

(B) The polymerisation batch under (A) is repeated, but working in the presence of 0.0005 part by weight of ferrous sulphate or 0.01 part by weight of copper sulphate as heavy metal ions. The products obtained have a K-value from 90 to 100, and spinning solutions with sufficient concentration and adequate viscosity can be prepared therefrom. The K-value has thus been reduced in relation to Experiment A by the addition of heavy metal ions. It is however frequently desirable or even necessary for the K-value to be even lower, such as in the range of from 75 to 100.

(C) If Experiment (B) is repeated, but adding 0.5 part by weight of thioglycol as regulator, the K-value can be lowered by another 10 to 15 units. Spinning solutions can be prepared from such polymers in a particularly advantageous manner. However, if the products are tested for their thermostability, the results obtained are not satisfactory.

The test is for example carried out by heating films, prepared from a solution of the polymer in dimethyl formamide, for three hours in the presence of air to 165° C. The films are substantially discoloured to a brown colour. In an arbitrary scale extending from 0 (colourless) to 20 (brown), the discolouration thereof, with a given film thickness, is substantially in the range from 6 to 12. The simultaneous use of heavy metal ions and regulators leads to polymers with the desired K-values, but these products have too small a thermostability.

(D) A polymerisation batch consisting of 95 parts by weight of acrylonitrile and 5 parts by weight of methyl acrylate is mixed with 700 parts by weight of water and 25 parts by weight of normal sulphuric acid with 1 part by weight of potassium persulphate, 2.5 parts by weight of sodium pyrosulphite and 0.1 part by weight of copper sulphate, 0.3 part by weight of sodium salt of ethylene diamine tetraacetic acid being added as complex former. After 5 hours, with a 90% conversion, a polymer is obtained which shows a K-value of 121 after being purified and dried. If the experiment is repeated, but using 5 parts by weight of sodium pyrosulphite and 0.001 part by weight of copper sulphate, a polymer with a K-value of 129 is obtained.

If the experiment is again repeated, but using 4 parts by weight of potassium persulphate, 1 part by weight of sodium pyrosulphite and 0.01 part by weight of copper sulphate, a 98% conversion after 18 hours leads to a polymer with a K-value of 150. All polymers have a far too high K-value. However, they have good thermostability and the discolourations thereof correspond to values from 1 to 2 when subjected to the thermostability test referred to under C. The use of heavy metal ions and complex formers thus also does not produce the desired result.

(E) It is only the combination of heavy metal ions, complex formers and regulators which leads to polymers with K-values in the desired range from 75 to 100, the said polymers showing such a high thermostability that their thermostability indices in the discolouration test referred to under (C) are in the range from 2 to 2.5.

Polymerisation batches of 95 parts by weight of acrylonitrile and 5 parts by weight of methyl acrylate are polymerised at 50° C. with 700 parts by weight of water and 25 parts by weight of normal sulphuric acid, containing 0.5 part by weight of thioglycol as regulator, with the polymerisation systems indicated in Tables 1 and 2.

With conversions of about 80 to 98%, polymers are obtained in 10 to 21 hours which show K-values between 75 and 87 and a thermostability index of 2 to 2.5.

EXAMPLE 2

If 95 parts by weight of acrylonitrile with 5 parts by weight of methyl acrylate in 700 parts by weight of water and 25 parts by weight of normal sulphuric acid are polymerised at 50° C. with 1 or 2 parts by weight of potassium persulphate, 2 parts by weight of sodium pyrosulphite, 0.002 part by weight of ferrosulphate as heavy metal ions and 0.2 part by weight of the sodium salt of ethylene diamine tetraacetic acid as complex former, polymers are obtained in 12 hours with a 90% conversion and have K-values of 120 or 110 and thermostability indices of 2.5 to 1.7.

If the experiment is repeated, using 2 parts by weight of potassium persulphate, 2 parts by weight of sodium pyrosulphite, 0.001 part by weight of ferrous sulphate as heavy metal ions, 0.2 part by weight of the sodium salt of ethylene diamine tetraacetic acid as complex former, and if in addition 0.5 part by weight of thioglycol is added as regulator, there is obtained in 15 hours at 50° C. and with an 85% conversion, a polymer with a K-value of 83 and a thermostability index of 2.5. By varying the quantity of the regulator, the molecular weight can be adjusted as desired between a K-value of 80 and 100.

TABLE 1

| Experiment No. | Parts potassium persulphate | Parts sodium pyrosulphate | Parts complex¹ former | Parts copper sulphate | Percent conversion | Conversion in hours | K-value | Thermostability index |
|---|---|---|---|---|---|---|---|---|
| 1 | 1 | 1 | 0.2 | 0.001 | 78 | 21.5 | 82 | 2.5 |
| 2 | 2 | 1 | 0.2 | 0.0005 | 93 | 20.5 | 76 | 2.5 |
| 3 | 2 | 1 | 0.2 | 0.01 | 88 | 15.5 | 75 | 2.5 |
| 4 | 2 | 2 | 0.2 | 0.01 | 90 | 15.5 | 75 | 2.5 |
| 5 | 2 | 3 | 0.2 | 0.01 | 85 | 15.5 | 80 | 2.5 |
| 6 | 5 | 2 | 0.2 | 0.01 | 98 | 15.5 | 74 | 2.5 |
| 7 | 5 | 3 | 0.2 | 0.001 | 98 | 11.5 | 80 | 2.5 |

TABLE 2

| | | | | | | | | |
|---|---|---|---|---|---|---|---|---|
| 8 | 2 | 1 | 1 | 0.0005 | 90 | 21 | 78 | 2.5 |
| 9 | 2 | 1 | 1 | 0.005 | 95 | 21 | 80 | 2.5 |
| 10 | 2 | 2 | 1 | 0.0005 | 93 | 21 | 81 | 2 |
| 11 | 2 | 3 | 1 | 0.0005 | 80 | 12.5 | 87 | 2 |

¹ Sodium salt of ethylene diamine tetraacetic acid.

I claim:

1. A method for the production of acrylonitrile polymers which comprises polymerizing a monomer selected from the group consisting of acrylonitrile and a mixture of acrylonitrile and methyl acrylate in an aqueous medium having a pH below 7 and containing a mixture of 0.00001–0.1%, based on the weight of monomer employed, of a heavy metal ion selected from the group consisting of copper and iron, 0.1–3% of a complex former selected from the group consisting of imido-triglycollic acid, ethylene diamine tetracetic acid, and alkali metal and ammonium pyrophosphates, hexametaphosphates, and fluorides, 0.05–3% of a molecular weight regulator selected from the group consisting of butyl mercaptan, hexyl mercaptan, thioglycol, and the dithioglycols of ethylene, butylene and hexylene and a Redox system selected from the group consisting of $SO_2$, ammonium persulfates, and the alkali metal bisulfites, pyrosulfites, thiosulfates, and persulfates, the polymerization being conducted at a temperature of 30°–70° C.

2. The process of claim 1 in which the Redox system consists of sodium pyrosulfite and potassium persulfate.

3. The process of claim 1 in which the molecular weight regulator is thioglycol.

4. The process of claim 1 in which the complex former is the sodium salt of ethylene diamine tetraacetic acid.

5. The process of claim 1 in which the iron is introduced in the form of ferrous sulfate.

6. The process of claim 1 in which the copper is introduced in the form of copper sulfate.

References Cited in the file of this patent

UNITED STATES PATENTS

| | | |
|---|---|---|
| 2,697,700 | Uraneck et al. | Dec. 21, 1954 |
| 2,878,200 | Holmes et al. | Mar. 17, 1959 |
| 2,974,123 | Ketterer | Mar. 7, 1961 |